US009691022B2

(12) United States Patent
Hernandez et al.

(10) Patent No.: US 9,691,022 B2
(45) Date of Patent: Jun. 27, 2017

(54) AUTOMATICALLY ENHANCED VISUAL PROCESS REPAIR USING PROCESS SUPERPOSITION AND UGLINESS INDICATORS

(71) Applicant: Xerox Corporation, Norwalk, CT (US)

(72) Inventors: Andres Quiroz Hernandez, Rochester, NY (US); Yasmine Charif, Rochester, NY (US); Julien Bourdaillet, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 582 days.

(21) Appl. No.: 14/252,172

(22) Filed: Apr. 14, 2014

(65) Prior Publication Data

US 2015/0294229 A1    Oct. 15, 2015

(51) Int. Cl.

| G06F 17/00 | (2006.01) |
|---|---|
| G06F 17/20 | (2006.01) |
| G06N 5/00 | (2006.01) |
| G06Q 10/00 | (2012.01) |
| G06N 99/00 | (2010.01) |
| G06N 5/04 | (2006.01) |
| G06N 5/02 | (2006.01) |
| G06F 9/44 | (2006.01) |
| G09B 7/04 | (2006.01) |

(52) U.S. Cl.
CPC .............. *G06N 5/00* (2013.01); *G06Q 10/00* (2013.01); *G06F 9/4446* (2013.01); *G06N 5/02* (2013.01); *G06N 5/04* (2013.01); *G06N 99/005* (2013.01); *G09B 7/04* (2013.01)

(58) Field of Classification Search
None
See application file for complete search history.

(56) References Cited

U.S. PATENT DOCUMENTS

2014/0279769 A1* 9/2014 Goodwin ............... G06N 5/022
706/14

OTHER PUBLICATIONS

Managing Process Model Complexity via Concrete Syntax Modifications—2011 Marcello La Rosa, Arthur H.M. ter Hofstede, Petia Wohed, Hajo A. Reijers, Jan Mendling and Wil M.P. van der Aalst, Member, IEEE.*

(Continued)

*Primary Examiner* — Kakali Chaki
*Assistant Examiner* — Ababacar Seck
(74) *Attorney, Agent, or Firm* — MH2 Technology Law Group LLP

(57) ABSTRACT

The present invention generally relates to systems and methods for visual process analysis. The disclosed techniques can include: obtaining a theoretical and an empirical process model, generating a theoretical process layout corresponding to the theoretical process model, where the theoretical process layout is generated using a layout algorithm, generating an empirical process layout corresponding to the empirical process model, where the empirical process layout is generated using the layout algorithm, superposing the empirical process layout onto the theoretical process layout, such that a superposition layout is generated, annotating the superposition layout based on ugliness indicators, such that an annotated superposition layout is generated, and causing the annotated superposition layout to be displayed.

12 Claims, 7 Drawing Sheets

(56) References Cited

OTHER PUBLICATIONS

A Linear Time Layout Algorithm for Business Process Models—2013 Thomas Gschwinda,, Jakob Pinggerab, Stefan Zugalb, Hajo A. Reijersc,d, Barbara Weberb aIBM Research, Zurich, Switzerland bUniversity of Innsbruck, Austria cEindhoven University of Technology, The Netherlands dPerceptive Software, The Netherlands.*

Y. Charif et al., "Business Process Behavior Conformance Checking and Diagnostic Method and System Based on Theoretical and Empirical Process Models Built Using Probabilistic Models and Fuzzy Logic", U.S. Appl. No. 14/017,861, filed Sep. 4, 2014.

Y. Charif et al., "A Method and System for Clustering, Modeling, and Visualizing Process Models From Noisy Logs", U.S. Appl. No. 14/081,203, filed Nov. 15, 2013.

Hernandez et al., "Method and System for Assessing Workflow Compatability", U.S. Appl. No. 13/863,594, filed Apr. 16, 2013.

* cited by examiner

AUTOMATICALLY ENHANCED VISUAL PROCESS REPAIR USING PROCESS SUPERPOSITION AND UGLINESS INDICATORS

FIELD OF THE INVENTION

This invention relates generally to detecting differences between theoretical and empirical processes.

SUMMARY

According to various embodiments, a computer-implemented method for detecting at least one difference between a theoretical process and an empirical process is disclosed. The method includes obtaining a theoretical process model, obtaining, using an electronic processor, an empirical process model corresponding to the theoretical process model, generating, using an electronic processor, a theoretical process layout corresponding to the theoretical process model, where the theoretical process layout is generated using a layout algorithm, generating, using an electronic processor, an empirical process layout corresponding to the empirical process model, where the empirical process layout is generated using the layout algorithm, superposing, using an electronic processor, the empirical process layout onto the theoretical process layout, such that a superposition layout is generated, annotating, using an electronic processor, the superposition layout based on ugliness indicators, such that an annotated superposition layout is generated, and causing, using an electronic processor, the annotated superposition layout to be displayed.

Various optional features of the above embodiments include the following. The theoretical process layout and the empirical process layout can include a longest path layout format. The superposing can include: maintaining in a same position at least one node representing a same activity in both the empirical process layout and the theoretical process layout, and placing in a different position at least one node from the empirical process layout. The method can include conforming an empirical process to the theoretical process model. The method can include enhancing the theoretical process model. The ugliness indicators can include an indication that an edge in the superposition layout appears in the empirical process layout but not in the theoretical process layout. The ugliness indicators can include an indication that an edge in the superposition layout appears in the theoretical process layout but not in the empirical process layout. The ugliness indicators can include an indication that a node in the superposition layout appears in the empirical process layout but not in the theoretical process layout. The ugliness indicators can include an indication that a node in the superposition layout appears in the theoretical process layout but not in the empirical process layout. The annotating can include assigning different colors to a plurality of ugliness indicators.

According to various embodiments, a computer-implemented system for detecting at least one difference between a theoretical process and an empirical process is disclosed. The system includes an electronic memory, and at least one electronic processor operatively coupled to the electronic memory and configured to: obtain a theoretical process model, obtain, using an electronic processor, an empirical process model corresponding to the theoretical process model, generate a theoretical process layout corresponding to the theoretical process model, where the theoretical process layout is generated using a layout algorithm, generate an empirical process layout corresponding to the empirical process model, where the empirical process layout is generated using the layout algorithm, superpose the empirical process layout onto the theoretical process layout, such that a superposition layout is generated, annotate the superposition layout based on ugliness indicators, such that an annotated superposition layout is generated, and cause the annotated superposition layout to be displayed.

Various optional features of the above embodiments include the following. The theoretical process layout and the empirical process layout can include a longest path layout format. The at least one processor can be further configured to: maintain in a same position at least one node representing a same activity in both the empirical process layout and the theoretical process layout, and place in a different position at least one node from the empirical process layout. The at least one processor can be further configured to provide a suggestion to conform an empirical process to the theoretical process model. The at least one processor can be further configured to enhance the theoretical process model. The ugliness indicators can include an indication that an edge in the superposition layout appears in the empirical process layout but not in the theoretical process layout. The ugliness indicators can include an indication that an edge in the superposition layout appears in the theoretical process layout but not in the empirical process layout. The ugliness indicators can include an indication that a node in the superposition layout appears in the empirical process layout but not in the theoretical process layout. The ugliness indicators can include an indication that a node in the superposition layout appears in the theoretical process layout but not in the empirical process layout. The at least one processor can be further configured to assign different colors to a plurality of ugliness indicators.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

A process, e.g., a business process, defines the orchestration of, e.g., automated services, human activities, and machines' operations, to achieve a specific goal. For instance, a child support process may include establishing alimony orders, locating a parent, establishing paternity, scheduling conferences, etc.

Processes can be modeled by a theoretical process model. Theoretical process models indicate how a process should, in theory, be performed. However, actual implementations of a process may differ from the theoretical process model.

Disagreement between a theoretical process model and usage data may lead to adaptations of the theoretical process model in what may be referred to as "process enhancement." Process enhancement can include process extension and process repair. Extension implies adding attributes such as costs, timestamps, and resources to a theoretical process model. Repair implies structurally modifying a theoretical process model to better reflect organizational practice.

Some embodiments highlight likely differences between a theoretical process model, e.g., as prescribed by an organization, and a corresponding empirical process, e.g., as discovered through usage data such as electronic logs. Some embodiments thus generate and annotate a spatial superposition of graphical depictions of the processes in a way that supports both visual and analytical, e.g., automated, identification of the differences. The analytical component may enhance the visualization by providing areas of the process representation that can be automatically highlighted as likely differences, rather than relying on the visual acuity of the user. To that end, the analytical component may utilize "ugliness" indicators, discussed in detail below.

Once the process has been shown with highlighted differences, process repair can be carried out by a user by translating these differences into specific pieces of the theoretical process model to remove, add, or modify. Alternately, or in addition, a user can ensure that subsequent instances of the process conform to the theoretical process model.

Figure 1:
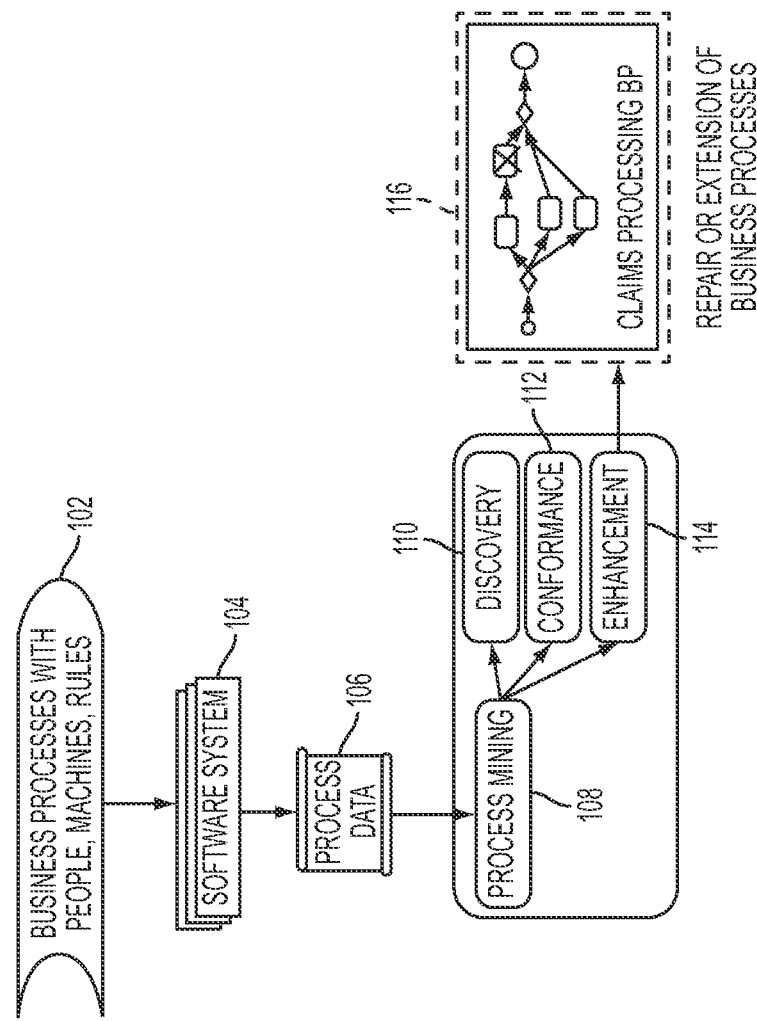
FIG. 1 is a schematic diagram providing context for some embodiments.

FIG. 1 is a schematic diagram providing context for some embodiments. An entity such as a corporation may implement processes such as business processes 102 using a software system 104. The software system 104 can in turn generate process data 106. In general, process mining 108 provides organizations with techniques to optimize their operations based on their processes, make better informed decisions, quickly address problem areas, and re-position themselves to take full advantage of emerging opportunities.

Process mining 108 can involve process discovery 110, process conformance 112, and/or process enhancement 114. Process discovery 110 aims to collect process usage data and formalizing processes as they happen in practice. Process conformance 112 compares usage data with the prescribed organization's process to check whether, and to what extent, deviations exist. For example, process conformance 112 can include checking if a prescribed rule of "two IDs being provided every time a check superior to $5K has been cashed" has been followed. Process enhancement 114 aims at extending or repairing 116 a prescribed process model using the information collected in the usage data 106 so that the model better reflects reality. For example, process enhancement 114 can include repairing a "locate" activity, which is modeled as using a legacy tool, such as the white pages, by replacing it with the complementary current practice of searching social media sites.

In the context of FIG. 1, some embodiments provide a process repair technique that provides visual recommendations, such as specific pieces of the process to remove, add, or modify, to a user. To that end, some embodiments utilize a spatial superposition of an empirical process layout onto a theoretical process layout. The visualization of the superposition is enhanced by providing areas of the process representation that can be highlighted as likely differences according to the "ugliness" of the layout of the activities and connections in the process.

As discussed in detail in reference to FIGS. 2-7, some implementations can include the following features.

(1) Discovering an empirical process that corresponds to a given theoretical process (discussed in reference to FIG. 2 below);

(2) Producing a graphical layout of the theoretical process, referred to as a "template" layout (discussed in reference to FIG. 3 below);

(3) Producing a graphical layout of the empirical process using the template as a reference (discussed in reference to FIG. 4 below);

(4) Evaluating an indicator for the nodes and edges of the empirical process to reflect deviations from the theoretical process (discussed in reference to FIG. 5 below); and (5) Presenting to the user the superimposed layouts, which can be color-coded to take ugliness indicators into account (discussed in reference to FIG. 6 below). The user will then be able to identify and confirm the process differences.

Figure 2:
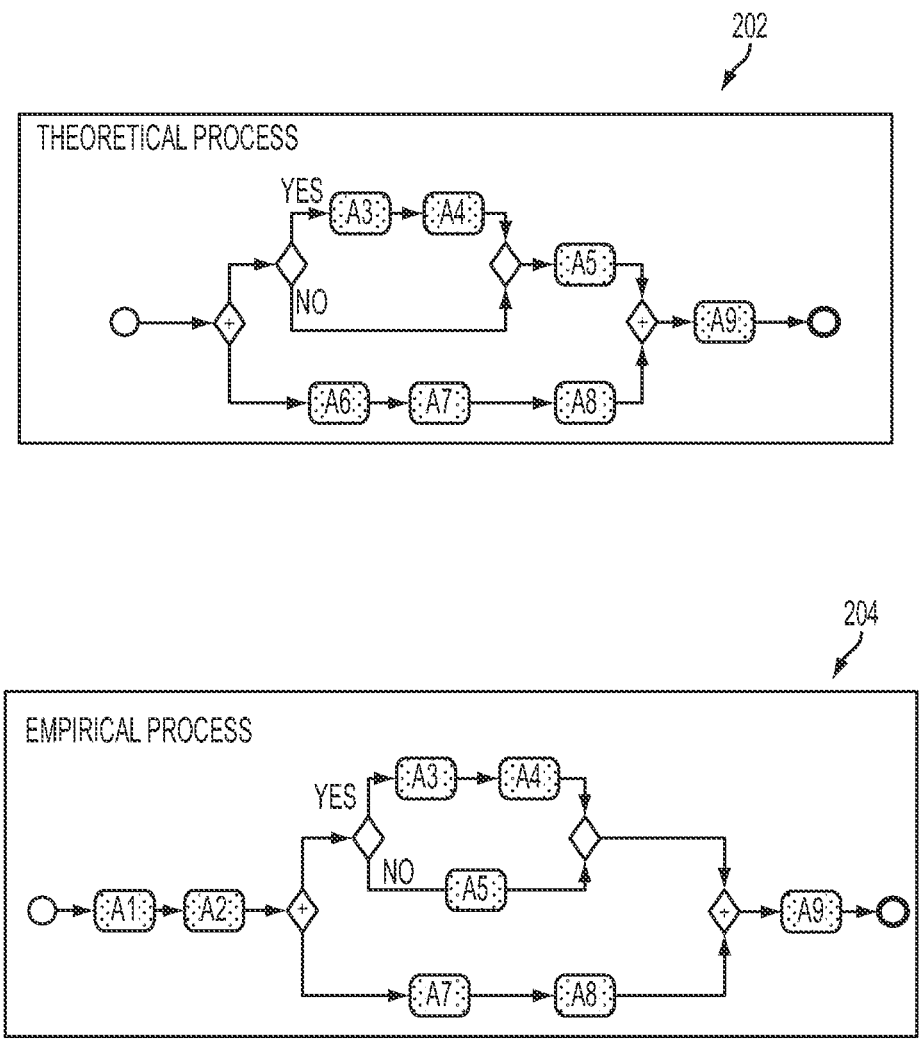
FIG. 2 is a schematic diagram of an empirical process model and its corresponding theoretical process model according to some embodiments.

FIG. 2 is a schematic diagram of an empirical process model 204 and its corresponding theoretical process model 202 according to some embodiments. The empirical process model corresponding to a given theoretical process model can be discovered using known techniques. If the organization carries more than one process, the distinction of these processes in the discovery task is made difficult by the fact that there will likely be a single collection of usage data with confounded output from all of the processes. In this case, a proper discovery of and correspondence between empirical and theoretical models can be performed using known techniques, or those disclosed in U.S. patent application Ser. No. 14/017,861 entitled, "BUSINESS PROCESS BEHAVIOR CONFORMANCE CHECKING AND DIAGNOSTIC METHOD AND SYSTEM BASED ON THEORETICAL AND EMPIRICAL PROCESS MODELS BUILT USING PROBABILISTIC MODELS AND FUZZY LOGIC" filed Sep. 4, 2013, the entirety of which is hereby incorporated by reference.

Figure 3:
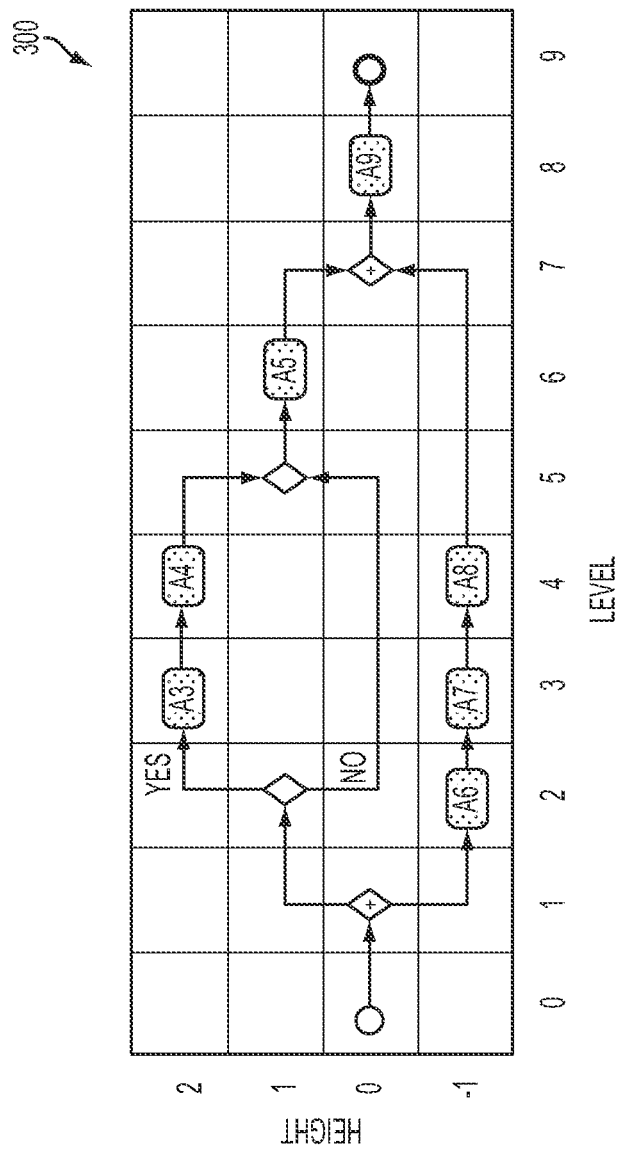
FIG. 3 depicts a theoretical process layout according to some embodiments.

FIG. 3 depicts a theoretical process layout 300 according to some embodiments. In particular, layout 300 corresponds to theoretical process 202 of FIG. 2. In general, various graphical layout techniques may be used. Example layout generation technique qualities include that the generated layout is meant for human consumption, and that the generated layout defines both the horizontal and vertical placement of each node, so that a corresponding relative position can be determined between nodes. In a layout, such as layout 300, a node's horizontal position may be referred to as the node's level, level(n), and its vertical position may be referred to as the node's height, height(n).

A particular layout generation technique, referred to as the longest path layout, was used to produce layout 300. The example longest path layout assigns the level of each node as the length of the longest path from the start. Nodes at a particular level are then given a height progressively farther from and alternating around the center (e.g. for five nodes, −2, −1, 0, 1, 2).

Figure 4:
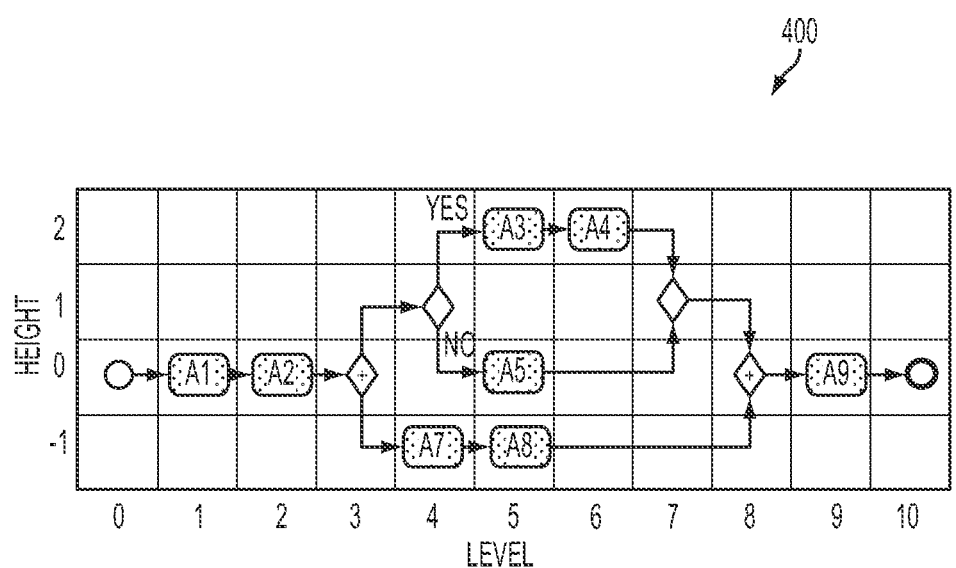
FIG. 4 depicts an empirical process layout according to some embodiments.

FIG. 4 depicts an empirical process layout 400 according to some embodiments. In particular, empirical process layout 400 corresponds to empirical process 204 of FIG. 2. Empirical process layout 400 was produced using the same (or equivalent) longest path layout generation technique as was used to generate theoretical process layout 300 of FIG. 3.

Figure 5:
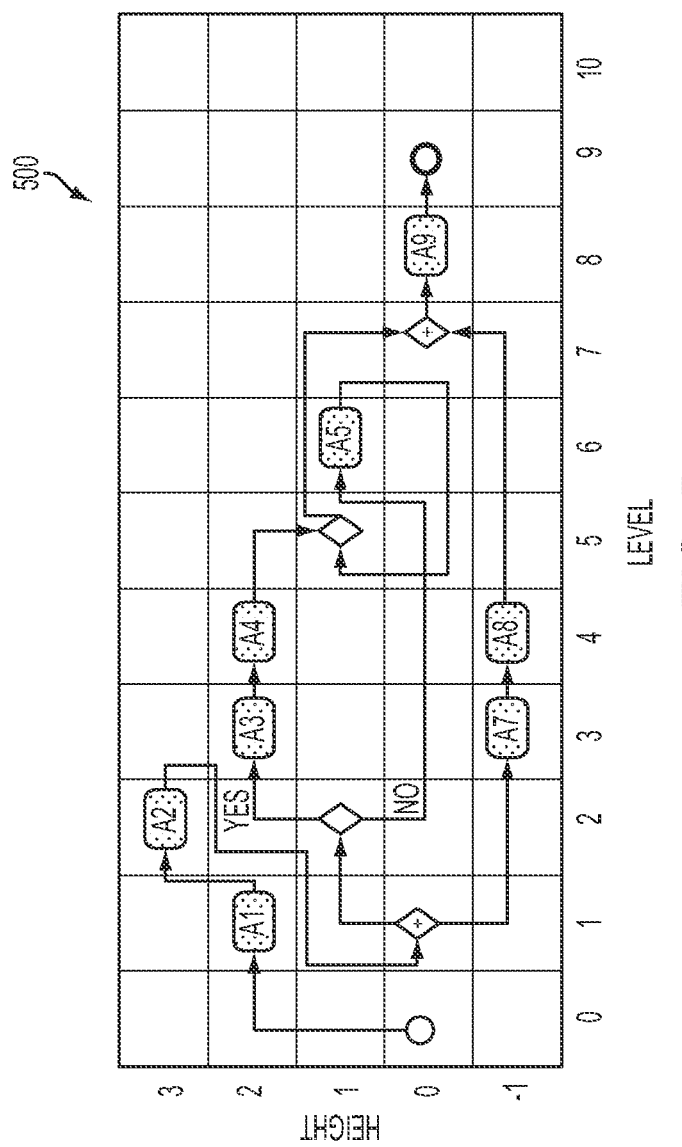
FIG. 5 depicts a superposition layout according to some embodiments.

FIG. 5 depicts a superposition layout 500 according to some embodiments. In particular, superposition layout 500 represents a graphical superposition of empirical process layout 400 of FIG. 4 onto theoretical process layout 500 of FIG. 5. Such a superposition layout may be produced as follows, for example. First, ensure that the empirical and theoretical process layouts using to generate the superposition were generated using the same, or equivalent, layout generation technique. Second, copy the empirical process layout into a new layout called a superposition layout. The empirical process layout will be used to determine ugliness indicators as discussed below. Third, for each node n in the empirical process layout:

(A) Determine if it has an anchor point, i.e. if a corresponding node t exists in the theoretical process such that n and t represent the same activity. In this case, assign the same level and height of t to n, symbolically represented as: $level_{superposition}(n) \leftarrow level_{template}(t)$ and $height_{superposition}(n) \leftarrow height_{template}(t)$.

(B) Otherwise, if there exists a node u in the theoretical process such that $level_{template}(u) = level_{superposition}(n)$ and $height_{template}(u) = height_{superposition}(n)$ then assign: $height_{superposition}(n) \leftarrow$ unused height h in template at level (n), such that $h \neq height_{superposition}(n)$. For a longest path layout technique, the height h could be calculated as $\max_{\{t \text{ such that } level(t) = level(n)\}}(height(t)) + 1$, for example.

The graphical result of this superposition technique, shown in FIG. 5, is a layout where matching nodes (i.e., anchor nodes) in both layouts have the same placement, and where all other nodes from the empirical process layout, representing new activities, are displaced from their original position by all other nodes from the theoretical process layout. Note also that the edges in the superposition are affected by the modified node placement, and are consequently rendered in new, potentially skewed, ways.

Some embodiments utilize the un-annotated superposition 500 of FIG. 5 to assist users in detecting deviations from a theoretical process model. Both node repositioning/displacement and edge rendering (and the skewness thereof) can be used by a human user to identify how an empirical process differs from a theoretical process. In other words, the superposition 500 by itself could be sufficient to aid a user in the task of process repair.

As discussed below in reference to FIG. 6, some embodiments annotate a superposition layout in an automated fashion to highlight those nodes and edges that are indeed skewed (e.g., ugly) versus those that are not, and to help distinguish what kind of differences they represent.

Figure 6:
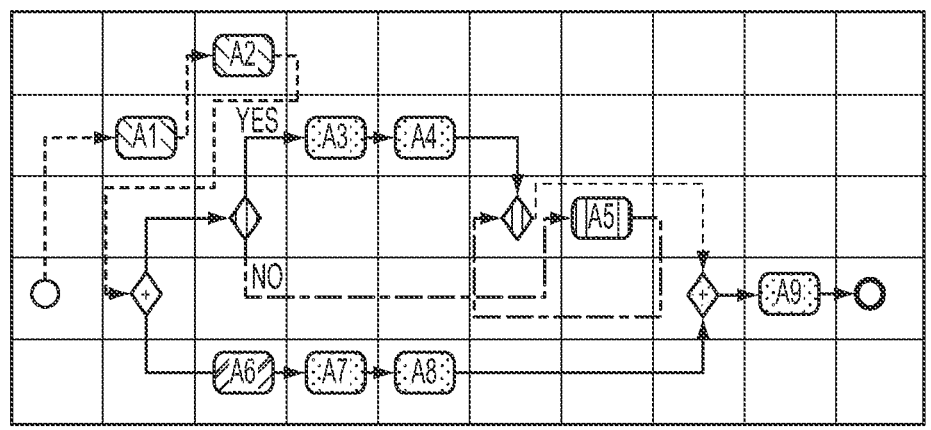
FIG. 6 depicts an annotated superposition layout according to some embodiments.
Figure 6:
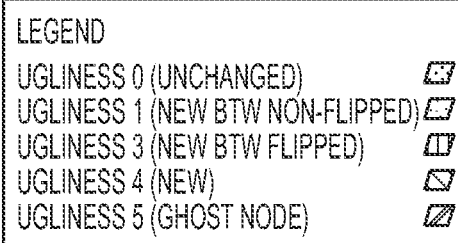

FIG. 6 depicts an annotated superposition layout according to some embodiments. In particular, annotated superposition layout 600 corresponds to superposition layout 500 of FIG. 5. As depicted in FIG. 6, some embodiments determine an ugliness indicator for each node and edge of the empirical process, based on their placement in the superposition layout relative to the empirical and theoretical process layouts. The ugliness indicators, though generated automatically by a computer and computer-intelligible, provide human users with indications that the placement of nodes in the superposition layout in some way negatively impacts the aesthetics of the layout.

Some embodiments determine ugliness indicators by considering new and missing nodes, and by considering certain changes (flips) in the relative position of matched connected nodes in the superposition layout. New nodes and the edges connecting them are determined to be ugly because, e.g., they have been displaced from their original position in the superposition layout by existing and missing nodes.

Determining ugliness based on flips may be based on the concepts of relative node position and of flips thereof as follows. The "relative horizontal position" of two nodes $n_1$ and $n_2$ is the difference in their level: $level(n_1) - level(n_2)$. The "relative vertical position" of two nodes $n_1$ and $n_2$ is the difference in their height: $height(n_1) - height(n_2)$. A "flip" with respect to two layouts A and B in the relative position of two nodes $n_1$ and $n_2$ occurs when the sign of either their relative horizontal or vertical positions is different between the two layouts. This is may be expressed as, by way of non-limiting example: $sign(level_A(n_1) - level_A(n_2)) \neq sign(level_B(n_1) - level_B(n_2))$ OR $sign(height_A(n_1) - height_A(n_2)) \neq sign(height_B(n_1) - height_B(n_2))$, where $sign(x)$ can be "+", "−", or "0".

Flips in relative position of connected nodes with respect to the superposition and original layouts may be informally characterized as ugly because they likely correspond to reversals in the dependency or precedence of nodes (e.g., introducing backward edges) or cause edges to drag across other existing parts of the graph.

Ugliness indicators for edges may be defined as provided below. Such indicators may be assigned in a traversal of the edges of the empirical and theoretical process layouts. Any automated graph traversal technique may be used. Prior to defining ugliness indicators for edges, edges themselves are defined as new, existing, and missing if they exist only in the empirical process, in both processes, or only in the theoretical process, respectively. With that understanding, ugliness indicators for edges may be defined as follows, for example.

Ugliness=0: Existing edge between non-flipped nodes (i.e. not ugly).
Ugliness=1: New edge between non-flipped nodes.
Ugliness=2: Existing edge between flipped nodes.
Ugliness=3: New edge between flipped nodes.
Ugliness=4: New edge between one or more new nodes.
Ugliness=5: Missing node or missing edge between non-flipped nodes (called "ghost" nodes and edges).
Ugliness=6: Missing edge between flipped nodes.

For nodes, unless directly specified above (as for ghost nodes), the ugliness indicator given to a node is defined as the maximum ugliness indicator given to any of its incoming or outgoing edges.

The numbering of the ugliness indicators is not meant as an absolute ugliness metric, since it would not be correct to state that edges or nodes with a higher ugliness indicator are necessarily uglier than those with a lower indicator. However, the ordering does represent a relative degree of ugliness that can be used to differentiate and even order the presentation of the superposition in the output to a user. In any case, an ugliness indicator of 0 represents a case that is not ugly or is the least ugly of all.

The annotated superposition may then be displayed such that the ugliness indicators correspond to different colors, patterns, textures, etc., for nodes and edges.

Figure 7:
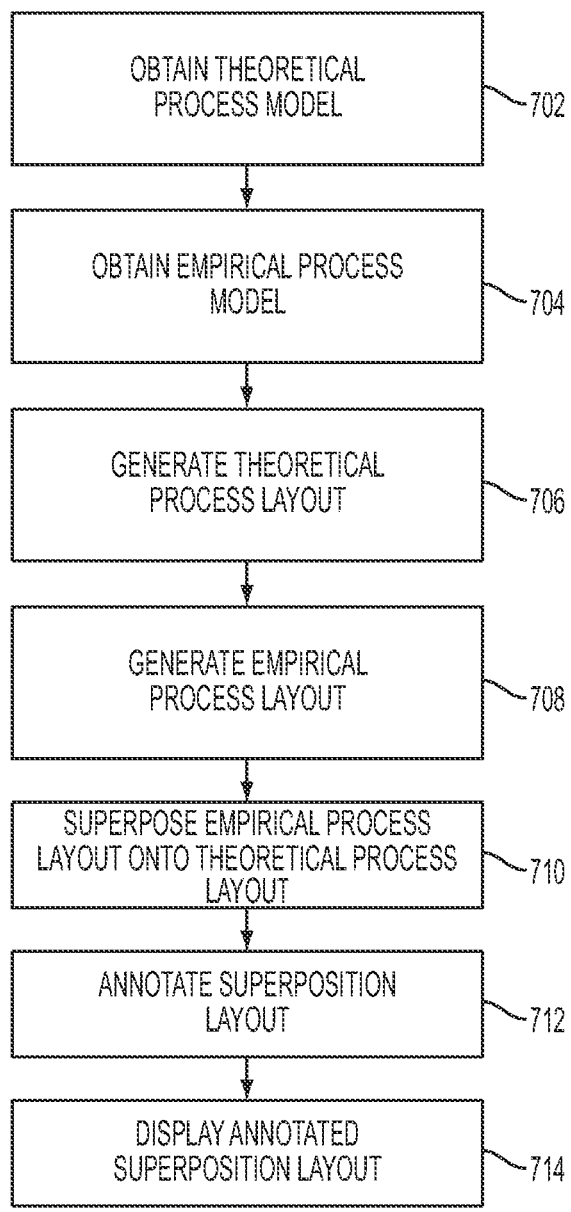
FIG. 7 is a flowchart of a method according to some embodiments.

FIG. 7 is a flowchart of a method according to some embodiments. The method may be implemented by electronic computer. At block 702, the method obtains a theoretical process model. The theoretical process model may be in any of a variety of electronic file formats, not limited to graphical flowchart depictions.

At block 704, the method obtains an empirical process model that corresponds to the theoretical process model obtained at block 702. The empirical process model may be obtained as discussed above in reference to FIG. 2, e.g., using a discovery process.

At block 706, the method generates a theoretical process layout. The theoretical process layout may be generated as discussed above in reference to FIG. 3, for example.

At block 708, the method generates an empirical process layout, using the same or an equivalent (i.e., produces the same layout, but in a different manner) layout generation technique as was used to generate the theoretical process layout of block 706. Thus, the empirical process layout may be generated as discussed above in reference to FIG. 3, for example.

At block 710, the method superposes the empirical process layout onto the theoretical process layout. The actions of this block may be performed as discussed above in reference to FIG. 4, for example.

At block 712, the method annotates the superposition layout of block 710. The annotation may be accomplished as discussed above in reference to FIG. 5, for example.

At block 714, the method causes the annotated layout to be displayed. This block may be performed electronically, by having one or more programmed processors to cause the annotated layout to be displayed on an electronic computer monitor, for example. At this block, the superposition is rendered for visualization by a user, employing ugliness indicators to differentiate the rendering of nodes and edges. Color-coding, where each rendered element is given a color according to its ugliness indicator, is one embodiment output option. Some embodiments may also use ugliness indicators to order, group, or filter the presentation of parts of the superposition to users, as well as to contrast the superposition with the original and/or theoretical layouts.

Different embodiments may utilize ugliness indicators in different fashions. For example, connected components of nodes and edges with the same ugliness indicator can be grouped. This way, entire components of added nodes, such as A1 and A2 in FIG. 6, or reordered nodes, such as the exclusive gateways and A5, can be shown independently. This can be especially effective if revealing nodes in different order (e.g., progressively revealing nodes and edges with increasing or decreasing ugliness indicators according to time, with, e.g., a half-second delay between reveals) or if contrasting the superposition layout with the theoretical and/or empirical layouts.

Further, elements (e.g., nodes and/or edges) with particular ugliness indictors may not need to be rendered for display. For instance, edges with ugliness=6 are not rendered in the superposition layout depicted in FIG. 6 (e.g. the edge between the start node and the first inclusive gateway). Embodiments may include this feature because such elements may be found to be redundant changes, already captured by nodes or edges with different indicators (e.g., added nodes A1 and A2 in FIG. 6). However, some embodiments that contrast the superposition with other layouts may display these edges.

Yet further, ghost nodes (e.g., ugliness=5) can be displayed very effectively to indicate missing nodes because of the new node displacement rule of as described in reference to FIG. 4 (e.g., they may not share the placement of any other node in the superposition).

In some embodiments, it is not necessary to assign the same color to nodes and edges of the same ugliness. For instance, as in FIG. 6, a particular color is associated to new nodes. Existing nodes, e.g. the start node, can be assigned a different color, even if they have the same ugliness (here, ugliness=4). In general, particular ugliness/element combinations may be rendered in different ways according to desired semantics.

Note that some embodiments electronically provide suggestions or electronically implement changes based on the annotated superposition. For example, some embodiments provide suggestions to conform an empirical process to the theoretical process model. This may be accomplished by, e.g., causing a message to be displayed. Such a message may be, for example, "The actions specified by node X of the theoretical process model are not being performed. Recommend contacting management to ensure future compliance." As another example, embodiments may provide altered theoretical process models that reflect how the process itself is actually being carried out as reflected by the corresponding empirical process model.

Certain embodiments described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method for detecting at least one difference between a theoretical process and an empirical process, the method comprising:
obtaining a theoretical process model;
obtaining, using an electronic processor, an empirical process model corresponding to the theoretical process model;
generating, using an electronic processor, a theoretical process layout corresponding to the theoretical process model, wherein the theoretical process layout is generated using a layout algorithm;
generating, using an electronic processor, an empirical process layout corresponding to the empirical process model, wherein the empirical process layout is generated using the layout algorithm;
superposing, using an electronic processor, the empirical process layout onto the theoretical process layout, whereby a superposition layout is generated;

annotating, using an electronic processor, the superposition layout based on ugliness indicators, whereby an annotated superposition layout is generated, wherein the ugliness indicators comprise an indication that: an edge in the superposition layout appears in the empirical process layout but not in the theoretical process layout, an edge in the superposition layout appears in the theoretical process layout but not in the empirical process layout, an indication that a node in the superposition layout appears in the empirical process layout but not in the theoretical process layout, or an indication that a node in the superposition layout appears in the theoretical process layout but not in the empirical process layout; and causing, using an electronic processor, the annotated superposition layout to be displayed.

2. The method of claim 1, wherein the theoretical process layout and the empirical process layout comprise a longest path layout format.

3. The method of claim 1, wherein the superposing comprises:
  maintaining in a same position at least one node representing a same activity in both the empirical process layout and the theoretical process layout; and
  placing in a different position at least one node from the empirical process layout.

4. The method of claim 1, further comprising conforming an empirical process to the theoretical process model.

5. The method of claim 1, further comprising enhancing the theoretical process model.

6. The method of claim 1, wherein the annotating comprises assigning different colors to a plurality of ugliness indicators.

7. A system for detecting at least one difference between a theoretical process and an empirical process, the system comprising:
  an electronic memory; and
  at least one electronic processor operatively coupled to the electronic memory and configured to:
    obtain a theoretical process model;
    obtain, using an electronic processor, an empirical process model corresponding to the theoretical process model;
    generate a theoretical process layout corresponding to the theoretical process model, wherein the theoretical process layout is generated using a layout algorithm;
    generate an empirical process layout corresponding to the empirical process model, wherein the empirical process layout is generated using the layout algorithm;
    superpose the empirical process layout onto the theoretical process layout, whereby a superposition layout is generated;
    annotate the superposition layout based on ugliness indicators, whereby an annotated superposition layout is generated, wherein the ugliness indicators comprise an indication that: an edge in the superposition layout appears in the empirical process layout but not in the theoretical process layout, an edge in the superposition lay appears in the theoretical process layout but not in the empirical process layout, an indication that a node in the superposition layout appears in the empirical process layout but not in the theoretical process layout, or an indication that a node in the superposition layout appears in the theoretical process layout but not in the empirical process layout; and
    cause the annotated superposition layout to be displayed.

8. The system of claim 7, wherein the theoretical process layout and the empirical process layout comprise a longest path layout format.

9. The system of claim 7 wherein the at least one processor is further configured to:
  maintain in a same position at least one node representing a same activity in both the empirical process layout and the theoretical process layout; and
  place in a different position at least one node from the empirical process layout.

10. The system of claim 7, wherein the at least one processor is further configured to provide a suggestion to conform an empirical process to the theoretical process model.

11. The system of claim 7, wherein the at least one processor is further configured to enhance the theoretical process model.

12. The system of claim 7, wherein the at least one processor is further configured to assign different colors to a plurality of ugliness indicators.

* * * * *